(12) United States Patent
Hessling et al.

(10) Patent No.: US 6,732,976 B2
(45) Date of Patent: May 11, 2004

(54) DEVICE FOR FASTENING A FIRST PART TO A SECOND PART

(75) Inventors: André Hessling, Lippstadt (DE); Bodo Wisch, Bremen (DE)

(73) Assignee: Goodrich Hella Aerospace Lighting Systems GmbH, Lippstadt (DE)

(*) Notice: Subject to any disclaimer, the term of this patent is extended or adjusted under 35 U.S.C. 154(b) by 0 days.

(21) Appl. No.: 10/208,812

(22) Filed: Aug. 1, 2002

(65) Prior Publication Data

US 2003/0089825 A1 May 15, 2003

Related U.S. Application Data

(60) Provisional application No. 60/365,542, filed on Mar. 20, 2002.

(30) Foreign Application Priority Data

Aug. 1, 2001 (DE) .......................................... 101 37 286

(51) Int. Cl.[7] ................................................. B64C 1/14
(52) U.S. Cl. ...................................... 244/119; 292/151
(58) Field of Search ............................. 244/119; 292/2, 292/80, 251, 256.73; 16/258, 389, 225, 226; 411/549–553, 84–85

(56) References Cited

U.S. PATENT DOCUMENTS

| 3,675,280 | A | * | 7/1972 | Winslade ................... 411/552 |
| 4,285,535 | A | * | 8/1981 | Leary ....................... 292/293 |
| 4,417,366 | A | * | 11/1983 | Salice ....................... 16/258 |
| 4,442,571 | A | * | 4/1984 | Davis et al. ............... 411/552 |
| 4,880,262 | A | * | 11/1989 | Mugnolo et al. ........... 292/202 |
| 5,819,371 | A | * | 10/1998 | Rock et al. ................. 16/258 |
| 6,062,053 | A | * | 5/2000 | Ho ............................. 70/233 |
| 6,247,744 | B1 | * | 6/2001 | Townsend et al. ....... 296/146.11 |
| 6,267,543 | B1 | * | 7/2001 | David et al. ............... 411/552 |

2002/0089185 A1 7/2002 Hessling et al.

FOREIGN PATENT DOCUMENTS

| DE | 197 30 269 A1 | 1/1999 |
| DE | 199 00 267 A1 | 7/2000 |
| EP | 1 215 082 A2 | 12/2001 |
| WO | WO 00/40436 A2 | 7/2000 |

* cited by examiner

*Primary Examiner*—Harold J. Tudor
*Assistant Examiner*—Daniel Matz
(74) *Attorney, Agent, or Firm*—Birch, Stewart, Kolasch & Birch, LLP

(57) ABSTRACT

A device for fastening a first part to a second part, particularly for fastening a lining element in the interior of a vehicle, for example an aircraft, is provided with at least one fastening element connectable with the first part and releasably attachable to the second part. The fastening element is provided with a locking element that is supported on the fastening element so as to be movable between a disengaged position in which the fastening element is able to be set to the second part and to be detached therefrom, and a pre-locking position in which the fastening element is held at the second part. Further, the fastening element comprises an actuating element for moving the locking element between the disengaged position and the pre-locking position. The fastening element is further provided with a first biasing element for biasing the locking element into the pre-locking position thereof, and a trigger element comprising at least one retaining projection for the locking element, the trigger element being supported on the fastening element between a retaining position in which the at least one retaining projection retains the locking element in the disengaged position thereof, and a releasing position in which the at least one retaining projection releases the locking element for moving into the pre-locking position. The trigger element is provided for abutting on the second part upon setting the fastening element to the second part.

36 Claims, 5 Drawing Sheets

DEVICE FOR FASTENING A FIRST PART TO A SECOND PART

This nonprovisional application claims priority under 35 U.S.C. § 119(a) on German Patent Application No. DE 101 37 286.8 filed in Germany on Aug. 1, 2001, which is herein incorporated by reference, and under 35 U.S.C. §119(e) on provisional application No. 60/365,542 filed on Mar. 20, 2002, which is also incorporated herein by reference.

BACKGROUND OF THE INVENTION

1. Field of the Invention

The present invention relates to a device for fastening a first part to a second part and particularly for fastening a lining element in the interior of a vehicle, which preferably is an airplane.

2. Description of the Background Art

From DE-A-199 00 267, DE-A-197 30 269, EP-A-1 215 082 and WO-A00/40436, a device for fastening a first part to a (stationary) second part of an aircraft is known, the first part being releasably connectable with the second part via a fastening element. The first part, for example, may be configured as a lining element with or without functional units such as, for example, an oxygen supply unit, reading lights, air nozzles or actuating elements for switching functional units on and off, such a lining element being adapted to be fastened to a C-shaped profile (second part). The fastening element comprises a basic body with a through-bore in which an actuating element coupled to a locking element is rotatably supported. The actuating element is, for example, a screw that can be turned by means of a screwdriver. The locking element having the shape of a parallelogram is disposed on that side of the basic body that faces the second part. Locking is effected by turning the locking element. To this end, the actuating element is axially pressed in an opposite direction to the biasing force of a spring in the direction of the second part, which means in the direction towards the C-shaped profile, which leads to the locking element being raised with respect to the abutting surface of the basic body abutting on the second part. Thus, the locking element is disengaged from abutting projections on the abutting surface of the basic body. Now, a turning of the locking element of about 90° can be effected by turning the actuating element, so that the locking element is brought into a pre-locking position. In this pre-locking position, the locking element is secured, at the second part, against being taken along further when the actuating element is turned. The actuating element and the locking element are in threaded engagement so that a further turning of the actuating element leads to an axial relative movement of the actuating element and the locking element when the locking element assumes its pre-locking position. Thus, the locking element is moved towards the abutting surface of the basic body, whereby a press fit is achieved between the locking element, the basic body and the second part.

Due to the fact that the basic body of the fastening element obstructs the view to the locking element during assembly, the assembler cannot see the turning position of the locking element from the outside. On the basis of the rotational position of the actuating element that, as is explained above, is accessible by a screwdriver or similar tool and is visible from the lower surface of the basic body facing away from the abutting surface and that is configured in the manner of a screw head, the rotational position thereof is no indication as to which turning position the locking element assumes, either. Particularly, the assembler cannot see if the locking element presently assumes its pre-locking position or its final locking position. Moreover, in case of the known fastening elements, the assembler always has to make sure, via a tool, that the locking element assumes its pre-locking position in which the fastening element is held so as to be secured against detachment at the second part, even though not in a definitely fixed manner.

SUMMARY OF THE INVENTION

It is, therefore, an object of the present invention to provide a device for fastening a first part to a (stationary) second part of a vehicle, for example an aircraft, such that the mounting of the fastening element to the second part is simplified.

In order to solve this object, the invention provides a device for fastening a first part to a second part, particularly for fastening a lining element in the interior of a vehicle, preferably an aircraft, the device being provided with at least one fastening element connectable to the first part and releasably attachable to the second part. The at least one fastening element being provided with a locking element being supported at the fastening element so as to be movable between a disengaged position in which the fastening element is able to be set to the second part and to be detached therefrom, and a pre-locking position in which the fastening element is held at the second part, and an actuating element for moving the locking element between the disengaged position and the pre-locking position.

According to a further embodiment of the invention, the at least one fastening element is further provided with a first biasing element for biasing the locking element into the pre-locking position thereof, and a trigger element comprising at least one retaining projection for the locking element. The trigger element is supported at the fastening element between a retaining position, in which the at least one retaining projection retains the locking element in the disengaged position thereof, and a releasing position, in which the at least one retaining projection releases the locking element for moving into the pre-locking position. The trigger element is also being provided for abutting on the second part when the fastening element is set to the second part.

The fastening device according to the invention comprises at least one fastening element adapted to be connected to the first part, particularly in a pivotal manner, and to be releasably attached to the second part. At the fastening element, there is a locking element supported so as to be rotatable between a disengaged position and a pre-locking position. In the disengaged position, the fastening element can be attached to the second part or detached therefrom, whereas it is secured against unintentional detachment at the second part in the pre-locking position of the locking element.

Turning the locking element between its disengaged position and pre-locking position is effected by an actuating element rotatably supported on the fastening element. By this actuating element, the locking element can preferably be moved not only between the two afore-mentioned positions, but, moreover, into a final locking position as well in which the fastening element is retained at the second part in a definitely fixed manner (in a form-fitting and/or frictionally engaged manner). Therefore, it is suitable if the actuating element is configured as, for example, a screw, which includes at the end of its threaded shank facing away from the screw head, a stop forming a press fit for the locking element when it abuts on the stop. The clamping connection between locking element and stop effects that the locking element is taken along by the actuating element when the actuating element is turned. When the locking element is moved from the disengaged position into the pre-locking position, a further turning of the actuating element (screw) effects a release of the press fit and a tightening of the locking element against areas of the second part.

According to the invention, it is provided that the locking element is biased into its pre-locking position. This means that the locking element automatically moves into its pre-locking position if it is released upon assuming its disengaged position. The biasing spring can either engage directly on the locking element or be indirectly coupled thereto by engaging on the actuating element. Preferably, the biasing spring is configured as a torsion spring (spiral spring or helical spring) penetrated by the actuating element.

The turning movement of the locking element from the disengaged position into the pre-locking position is triggered by a trigger element abutting on the second part when the fastening element is attached thereto. Because of the abutment, the trigger element is transferred from a retaining position into a releasing position when the fastening element presses against the second part. In the retaining position, the trigger element blocks the movement of the locking element by at least one retaining projection, whereas the trigger element releases the locking element in its releasing position in which the at least one retaining projection is thus moved out of the path of movement of the locking element.

The advantage of the fastening device according to the invention is to be seen in that the locking element is in the disengaged position at that time when it is introduced into the second part and the fastening element, with pressure, abuts on the second part, in order to then automatically pivot into the pre-locking position. In the disengaged position, the locking element has no contact with the second part when the fastening element is introduced into it or abuts on it. For reasons of safety, the surfaces of the locking element and the second part, which contact each other in the state of attachment, are coated for protection against corrosion, for example. The advantage of the fastening device according to the invention is that this protective coating is not damaged by a contact of the locking element and the second part upon setting on the fastening device.

The locking element and the second part can be made of metal. Since the locking element is biased into its pre-locking position, a visually perceptible automatic contact occurs after the locking element has been introduced into the second part. Thus, the assembler receives an acoustic feedback when the locking element has assumed its pre-locking position.

In a further embodiment of the invention, the trigger element is biased into its retaining position by at least one biasing element. Thus, the trigger element safely assumes this retaining position which reduces the danger of the locking element making an unintended transition into the pre-locking position when handling the fastening element before the latter abuts the second part.

The afore-mentioned biasing element for the trigger element is suitably configured as a helical pressure spring. All other spring mechanisms or biasing means, however, are possible as well. This, by the way, also applies to the biasing element biasing the locking element into the pre-locking position thereof. Also, the movement of the locking element from the disengaged position into the pre-locking position does not necessarily have to be a turning movement. Other movements, for example lateral movements, are also possible.

Beside the automatic movement of the locking element into the pre-locking position, it is also suitable to additionally provide a visual indication as to whether the locking element has assumed its pre-locking position. Suitably, this is realized in that the locking element or the trigger element or the actuating element are coupled with an indicator element, preferably in the form of an indicator pin. This indicator element assumes different positions, depending on the assumption of the position of the locking element. Thus, for example, it would be conceivable that the indicator element projects from the fastening element when the locking element is in its pre-locking position. This has the advantage that the indicator element can be felt, which means that no direct visual contact with the indicator element is required to make sure that the locking element has assumed its pre-locking position.

The indicator element is connected to one of those elements of the fastening element that move in common with the locking element when the latter moves from the disengaged position into the pre-locking position. These elements are represented by the locking element in particular; alternatively, however, it might also be that the indicator element is coupled with the actuating element for the locking element. This requires that, which per se is the case, the actuating element moves in common with the locking element when the locking element is transferred from the disengaged position into the pre-locking position.

Alternatively, it is also possible to couple the indicator element with the trigger element. Namely, the locking element automatically moves into the pre-locking position when the trigger element assumes its releasing position.

As already explained above, the indicator element may be an element projecting from the fastening element in its one state and standing back with respect to the fastening element or being even with the outside thereof in its other state. It is also possible, however, that, when looking at the fastening element, the indicator element is visible in the one position and not in the other one. Those areas of the indicator element respectively visible may also have different colors. Finally, it is also possible to give a color to the indicator element which differs from that of the fastening element.

By providing the indicator element, a further visual and tactile indication possibility has thus been presented for the circumstance that the locking element is in its pre-locking position. These indication possibilities then exist in addition to the acoustic acknowledgment already mentioned above as to that the locking element has assumed its pre-locking position.

The above-described configuration of the fastening element according to the invention, with the feature that an indication is made as to whether the locking element has assumed its pre-locking position and final locking position, respectively, can be realized independent of whether the locking element is biased. Insofar, each modification by itself defines subject matter to be protected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
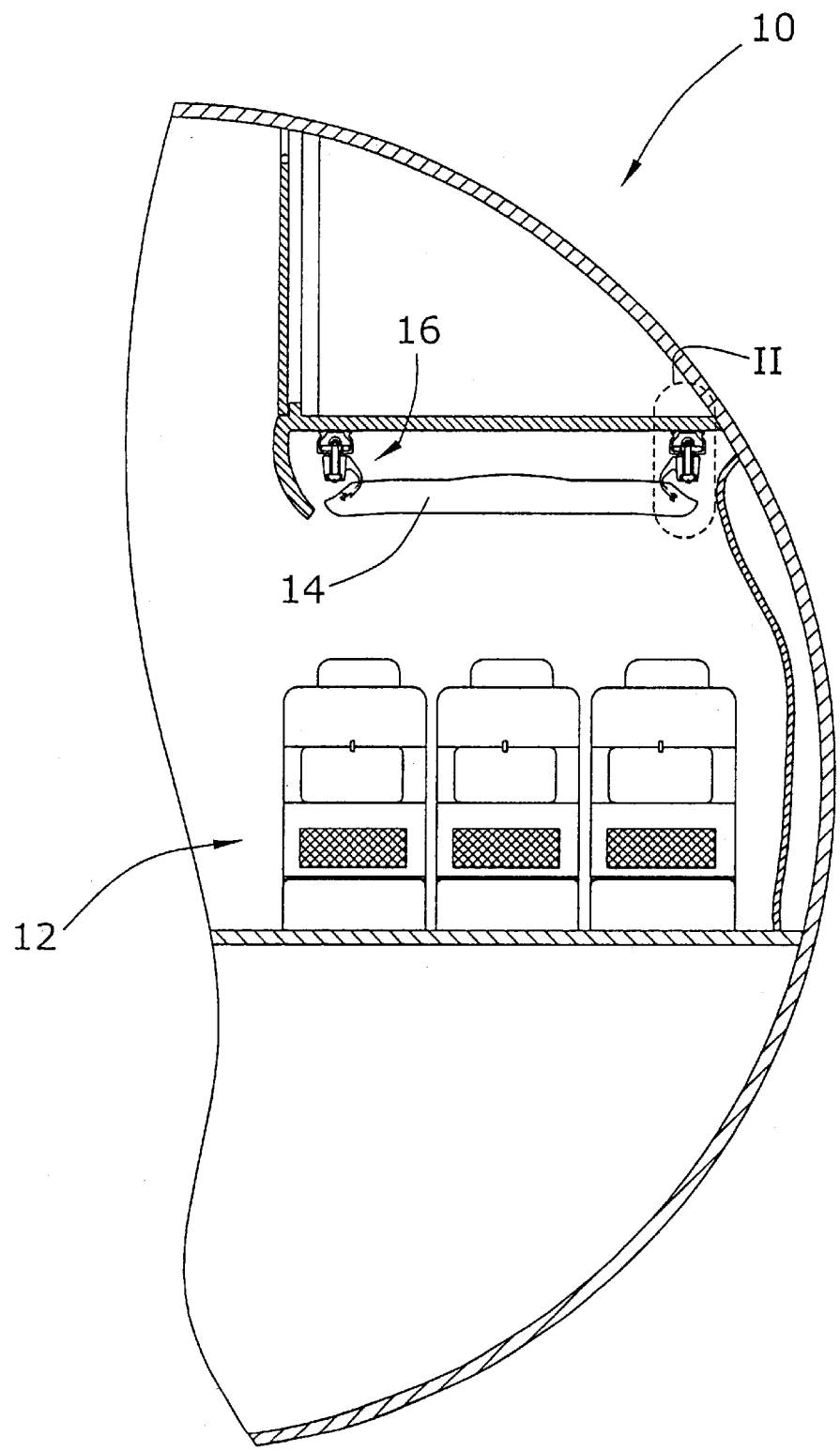
FIG. 1 shows a partial section of an airplane cabin.

FIG. 1 shows a cross-section of a portion of an airplane cabin 10 where a fastening device according to the invention, with several fastening elements 16, is used for fastening lining elements 14 located above the airplane seats 12. The structure of a fastening element and its cooperation with a lining element 14, on the one hand, and with a holding structure 18 of the airplane, on the other hand, will be explained in the following with reference to FIGS. 2 to 7.

The fastening element 16 comprises a basic body 20 supported, via two brackets 22 (see FIGS. 3 and 5), so as to be pivoted about an axle pin 24 fastened to the lining element 14. Through the basic body 20 of the fastening element 16, a throughbore 26 passes in which an actuating element 28 in the form of a screw 30 is located. While the screw head 32 is disposed in a recess 34 at the lower end 36 of the basic body 20, the opposed end 38 of the screw 30 projects beyond the upper end 40 of the basic body 20. At this end 38 of the screw 30, a stop 42 in the form of a screw nut 44 is located which is connected with the screw 30 in a definitely fixed manner. This means that the screw nut 44 cannot be moved relative to the screw 30 (both connected securely against relative rotation).

Figure 3:
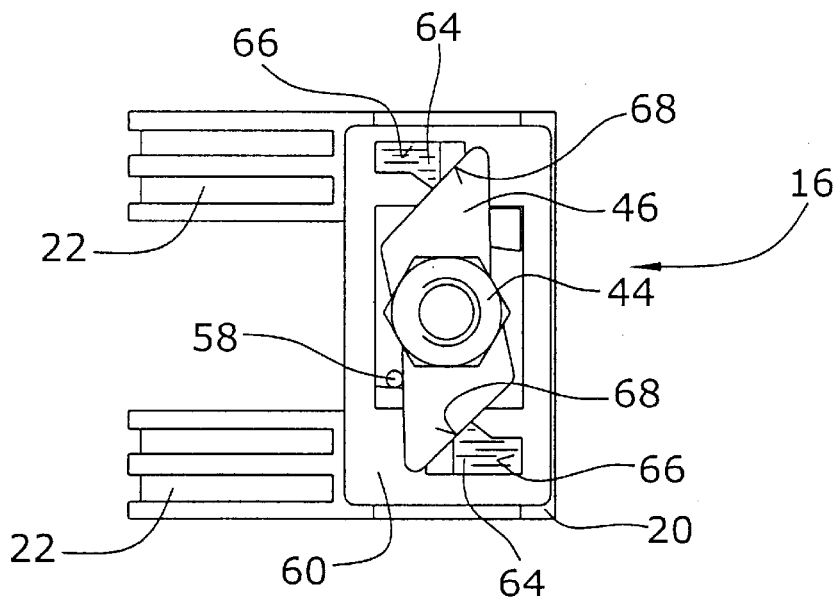
FIG. 3 shows a top view of the fastening element with the locking element being in its disengaged position.
Figure 5:
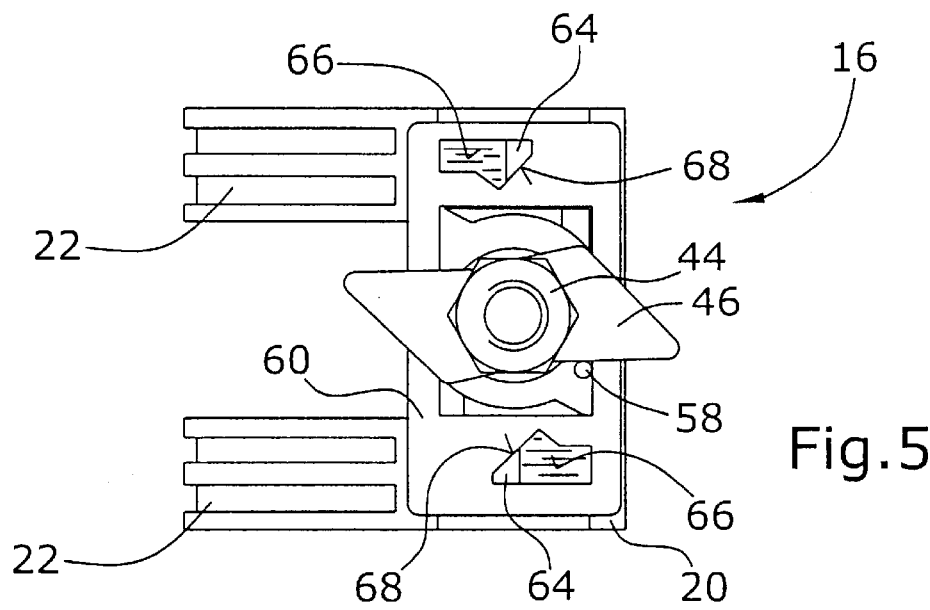
FIG. 5 shows a top view of the fastening element with the locking element being in the pre-locking position.

A locking element 46 having the shape of a parallelogram, as can be seen, for example, in FIGS. 3 and 5, is in threaded engagement with the thread of the screw 30.

The locking element 46 is able to assume two different turning positions shown in FIGS. 3 and 5. According to FIG. 3, the locking element 46 assumes its disengaged position in which, seen in top view, it does not project beyond the basic body 20 of the fastening element 16. In its position according to FIG. 5, in which it is substantially turned by 90°, the locking element 46 assumes its pre-locking position that it maintains in the completely locked state.

Figure 2:
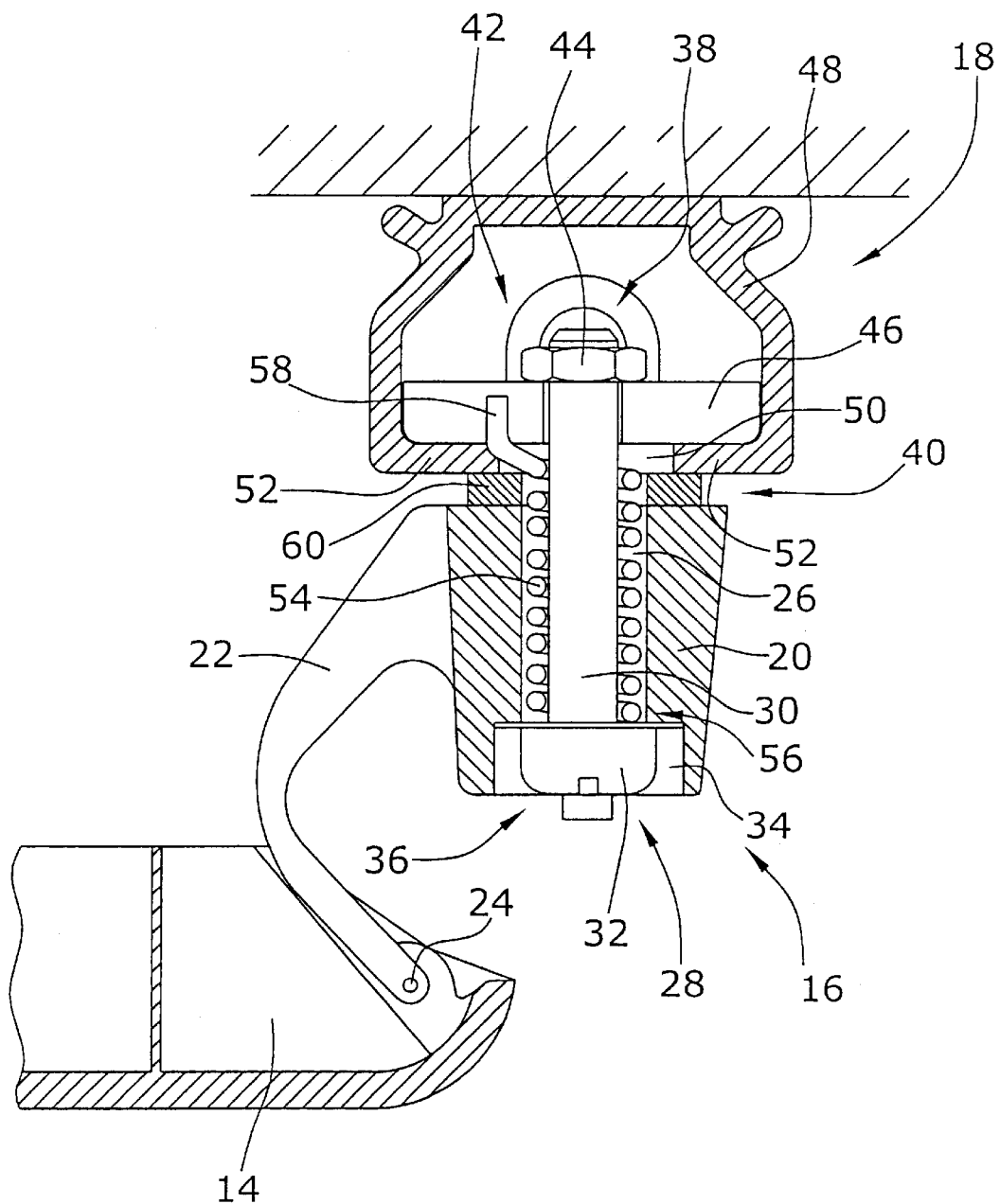
FIG. 2 shows an enlarged illustration of the section II of FIG. 1, the locking element being in its pre- and final locking position, respectively, in this illustration.
Figure 4:
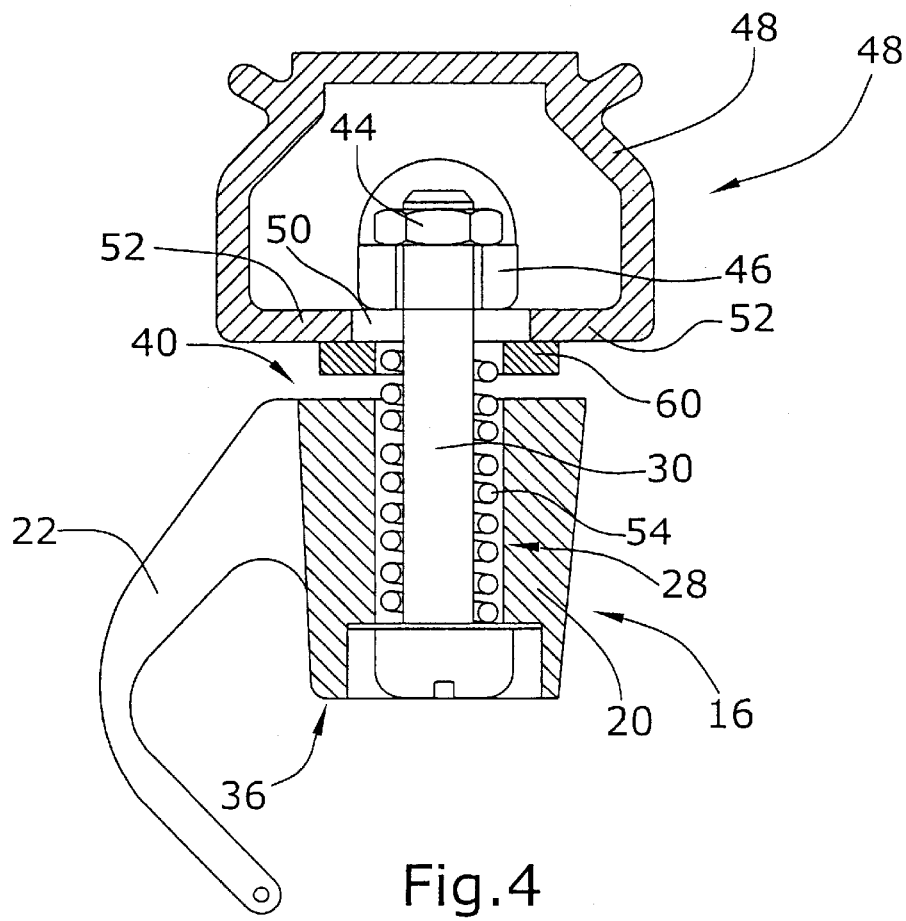
FIG. 4 shows an illustration similar to that of FIG. 2, but in that state in which the locking element is already introduced into the C-shaped second part but still assumes its disengaged position.
Figure 6:
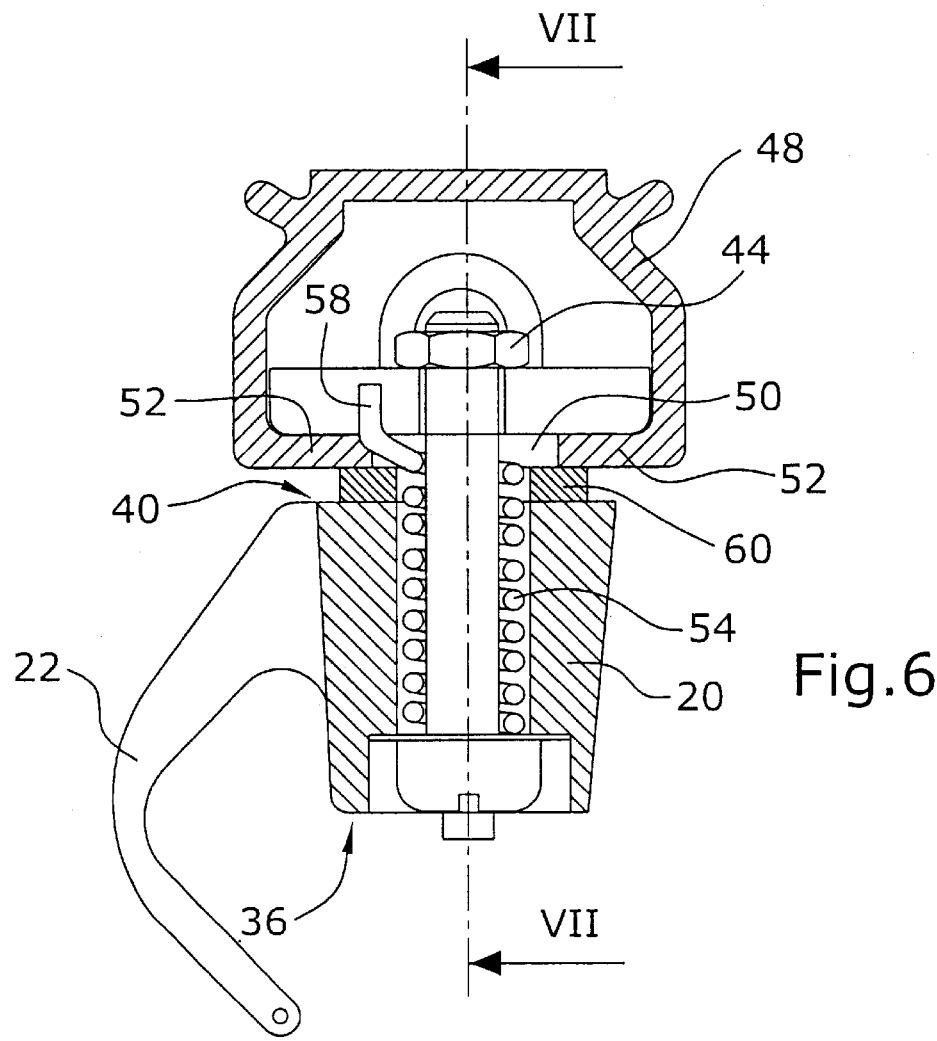
FIG. 6 illustrates a further embodiment in which the fastening element is pressed against the C-shaped second part and the locking element has turned in its pre-locking position as a consequence thereof.

While FIGS. 3 and 5 show the situations in which the fastening element 16 is free of a holding structure 18 of the airplane, FIGS. 2, 4 and 6 show the situations in the installed state. In the installed state, the locking element 46 is immersed into a C-shaped profile 48 having an introduction opening 50. The introduction opening 50 is slightly broader than the narrower dimension of the bar-or web-shaped locking element 46. This means that, when the locking element 46 is in its locking position according to FIG. 3, the fastening element 16 can be brought together with the C-shaped profile 48 in such a manner that the locking element 46 is able to be introduced into the C-shaped profile 48 through the opening 50 (see FIG. 4). In the preassembled and finally assembled state (see FIGS. 6 and 2), the locking element 46 assumes its pre- and final locking positions, respectively, in which the locking element 46, from inside, abuts on leg ends 52 of the C-shaped profile 48 defining the opening 50. By tightening the screw 30, the locking element 46 and the basic body 20 are moved against each other to clampingly hold the leg ends 52 between them (engagement in a frictional, definitely fixed manner).

The peculiarity of the fastening element 16 described herein is that the locking element 46, upon setting the basic body 20 to the C-shaped profile 48, makes a transition from its disengaged position assumed so far (see FIGS. 3 and 4) to the pre-locking position (see FIGS. 5 and 6). This is achieved by the locking element 46 being biased into its pre-locking position. To this end, the fastening element 16 comprises a torsion spring 54 in the form of a helical spring one end 56 of which is fixed at the basic body 20 and the other end 58 of which abuts on the locking element 46. The torsion or turning of the torsion spring 54 for generating the bias is selected such that the spring end 58, starting from the situation according to FIG. 3, moves the locking element 46 counterclockwise until the locking element 46 assumes its pre-locking position according to FIG. 5. Even in this pre-locking position, the locking element 46 may still be subject to a force through the spring 54 or the spring end 58. In the pre-locking position (and in the final locking position as well), the locking element 46 additionally abuts on the C-shaped profile 48 from the inside (see FIGS. 2 and 6).

To prevent that the locking element 46 does not automatically pivot into the pre-locking position according to FIG. 5 when it has assumed its disengaged position according to FIG. 3, the fastening element 16 comprises a trigger element 60 movable between a retaining position and a releasing position. In this embodiment, the trigger element 60 is configured like a plate disposed at the upper end 40 of the fastening element between the basic body 20 thereof and the locking element 46. In its retaining position, the trigger element 60 is biased against the lower side of the locking element 46 which faces the basic body 20. To this end, the trigger element 60 is biased against the locking element 46 via two pressure springs 62 supported in the basic body 20 (see FIG. 7).

On the upper surface of the trigger element 60 facing the locking element 46, two opposed retaining projections 64 are located which comprise obliquely extending ramp surfaces 66 as well as steep retaining surfaces 68. In the illustration according to FIG. 3, the locking element 46, with two of its limiting surfaces, abuts on the retaining surfaces 68 of the two retaining projections 64.

When the fastening element 16, starting from the situation according to FIG. 4 in which the trigger element 60 abuts the leg ends 52 of the C-shaped profile 48, is moved further towards the C-shaped profile 48, the locking element 46 moves away from the trigger element 60 until the locking element 46 projects beyond the retaining projections 64. At this moment, the locking element 46 is released and able to pivot into its pre-locking position. Then, the trigger element 60 is in its releasing position (see FIGS. 6 and 7).

The locking element's assumption of the pre-locking position is accompanied by an acoustic signal (click sound) since the locking element 46 comes into abutment on the C-shaped profile 48 from inside. This means that an acoustic acknowledgment is made as to that the locking element 46 has assumed its pre-locking position.

Figure 7:
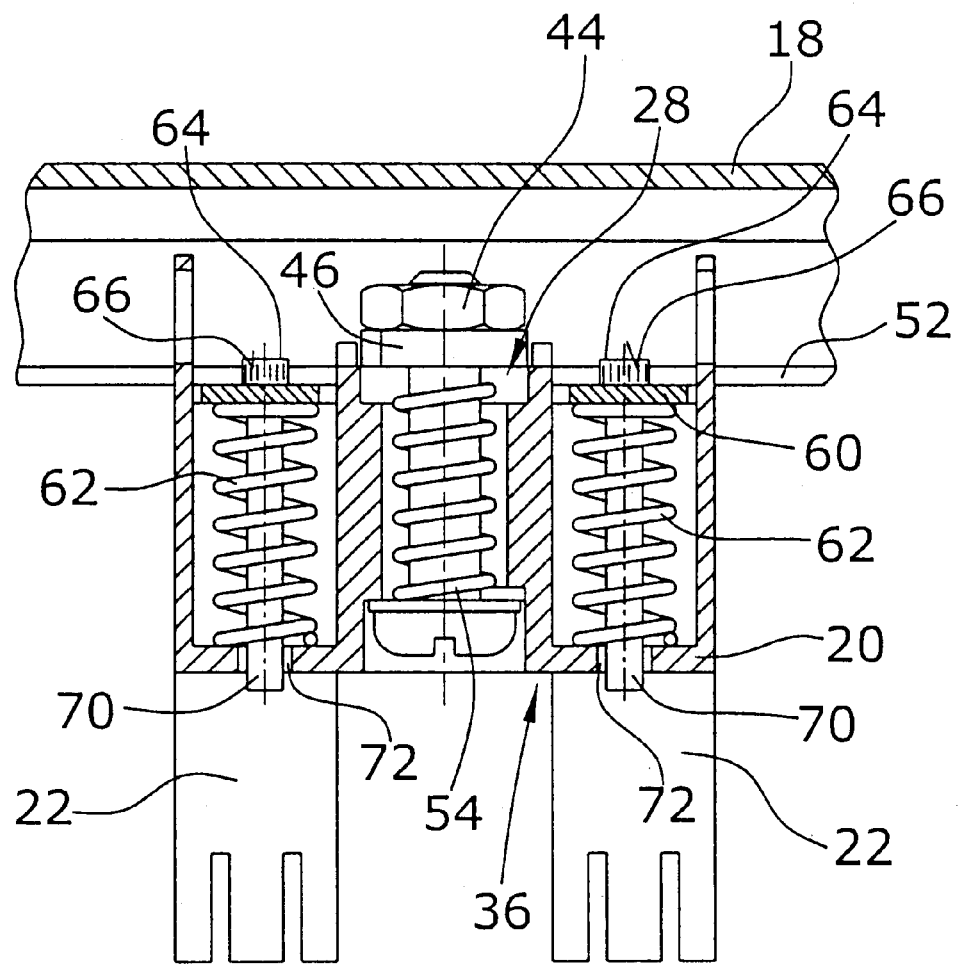
FIG. 7 shows a section along the line VII—VII of FIG. 6.

Additionally, however, the fastening element 16 under discussion is also provided with a visual indication for the assumption of the pre-locking position by the locking element 46. FIG. 7 shows that two pin-shaped indicator elements 70 penetrating the two helical pressure springs 62 project from the trigger element 60 to the lower surface 36 of the basic body 20. When the trigger element 60 has assumed its releasing position, the ends of the indicator elements 70 project beyond the lower surface 36 of the basic body 20 and project through openings 72 arranged there. In contrast thereto, the ends of the indicator elements 70 are retracted into the basic body 20 or even with the lower surface 36 of the basic body 20 when the trigger element 60 is in its retaining position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for fastening a first part to a second part, the device comprising:
   at least one fastening element connectable to the first part and releasably attachable to the second part, the at least one fastening element comprising:
   a locking element being supported at the fastening element so as to be movable between a disengaged position in which the fastening element is able to be set to the second part and to be detached therefrom, and a pre-locking position in which the fastening element is held at the second part; and
   an actuating element for moving the locking element between the disengaged position and the pre-locking position;
   a first biasing element for biasing the locking element into the pre-locking position thereof; and
   a trigger element comprising at least one retaining projection for the locking element,
   wherein the trigger element is supported at the fastening element between a retaining position, in which the at least one retaining projection retains the locking element in the disengaged position thereof, and a releasing position, in which the at least one retaining projection releases the locking element for moving into the pre-locking position, and
   wherein the trigger element abuts the second part when the fastening element is set to the second part.

2. The device according to claim 1, wherein the trigger element is biased into its retaining position by at least one second biasing element.

3. The device according to claim 1, wherein the first biasing element is configured as a torsion spring and particularly as a spiral or helical spring.

4. The device according to claim 2, wherein the at least one second biasing element is configured as,a helical pressure spring.

5. The device according to claim 2, wherein the at least one fastening element comprises a basic body at which the first biasing element and, if existing, the second biasing element, the trigger element and the actuating element coupled with the locking element are disposed.

6. The device according to claim 1, wherein the fastening element further comprises an indicator element, coupled with the locking element for indicating whether the locking element is in its pre-locking position.

7. The device according to claim 6, wherein the indicator element is coupled with the trigger element and indicates whether the trigger element is in its releasing position and thus the locking element in its pre-locking position.

8. The device according to claim 7, wherein the at least one indicator element is particularly integrally connected with the trigger element.

9. The device according to claim 6, wherein the at least one indicator element is visible from outside of the basic body of the fastening element in its indicating position, thereby indicating that the locking element has assumed the pre-locking position.

10. The device according to claim 9, wherein the at least one indicator element, in its indicating position indicating that the locking element has assumed the pre-locking position, projects from the basic body.

11. The device according to claim 6, wherein the indicator element is configured as an indicator pin.

12. The device according to claim 6, wherein the indicator element has a coloration and/or surface structure differing from that of the basic body of the fastening element.

13. A device for fastening a first part to a second part of a vehicle, the first part being releasably connectable with the second part via a fastening element connectable with the first part, the fastening element comprising:
   a locking element being adapted to be actuated from a side of the basic body that is facing away from the second part upon attaching the fastening element thereto, and is held at the basic body so as to be secured against being lost and is arranged on a side of the basic body facing the second part when the fastening element is attached thereto, the locking element being adapted to be turned, about a rotational axis, into a pre-locking position in which the fastening element is non-positively held at the second part,
   wherein between the basic body and the locking element, a trigger element is arranged that is supported on the basic body in the direction of the rotational axis of the locking element while being biased towards the locking element, and
   wherein the locking element is biased with respect to the basic body by means of a spring in such a manner that the locking element is able to turn automatically into a pre-locking position retaining the fastening element at the second part after the trigger element has moved away from the locking element.

14. The device according to claim 13, wherein the spring is configured as a helical spring biased around the rotational axis of the locking element, extending between the locking element and an abutting surface of the basic body.

15. The device according to claim 13, wherein one end of the spring, with abuts on the locking element and/or an actuating element coupled thereto.

16. The device according to claim 13, wherein the trigger element is supported against the basic body by at least one spring.

17. The device according to claim 13, wherein at least one indicator element projects from the trigger element, said indicator element being visible on a side of the basic body facing away from the second part upon attaching the fastening element thereto after the trigger element has been displaced relative to the basic body.

18. The device according to claim 17, wherein the indicator element is configured as an indicator pin extending along the spring for the trigger element.

19. The device according to claim 17, wherein the indicator element has a coloration different from that of the basic body.

20. The device according to claim 13, wherein the trigger element comprises a recess on the side facing the locking element, in which recess the locking element is arranged in its disengaged position, and that the trigger element comprises a raised retaining projection for the locking element.

21. The device according to claim 13, wherein the trigger element is configured like a plate covering nearly the entire side of the basic body facing the second part when the fastening element is attached thereto.

22. The device according to claim 1, wherein the device is used for fastening a covering element in the interior of a vehicle.

23. The device according to claim 22, wherein the vehicle is an aircraft.

24. A fastening element for releasably attaching a first part to a second part, the fastening element comprising:

a first part retaining portion for retaining the first part;

a basic body having a bore, which connects a first end to a second end of the basic body;

an actuating element being rotatably disposed in the bore of the basic body, such that an upper end of the actuating element projects beyond the second end of the basic body;

a stop being attached to the upper end of the actuating element such that the stop is fixedly attached to the actuating element; a locking element positioned between the stop and the second end of the basic body, the locking element being rotatably displaced into either a disengaged position or a pre-locking position, the locking element being adapted to fit within an introduction opening of the second part in the disengaged position;

a torsion spring being displaced within the bore about the actuating element, the torsion spring having one end abutting the locking element and a second end fixedly held at the basic body for generating a bias against the locking element such that the locking element is rotatably displaced from the disengaged position to the pre-locking position; and a trigger element disposed between the locking element and the second end of the basic body, the trigger element being movable between a retaining position and a releasing position, the trigger element being biased via springs in a direction towards the locking element such that retaining projections, which are formed on the trigger element, contain the locking element in the disengaged position when the trigger element is in the retaining position.

25. The fastening element according to claim 24, wherein the first part retaining portion is a bracket and pivotably retains the first part.

26. The fastening element according to claim 24, wherein an operable end of the actuating element is disposed in a recess formed in the first end of the basic body.

27. The fastening element according to claim 24, wherein the locking element is rotated substantially 90 degrees in order to displace the locking element from the disengaged position to the pre-locking position.

28. The fastening element according to claim 24, wherein the locking element, when positioned in the pre-locking position, is formed such that a width of the, locking element is greater than the introduction opening of the second part.

29. The fastening element according to claim 24, wherein the locking element is threadably engaged with the actuating element.

30. The fastening element according to claim 24, wherein the locking element is shaped in the form of a parallelogram.

31. The fastening element according to claim 24, wherein the trigger element is movable in a direction perpendicular to the rotation of the actuating element.

32. The fastening element according to claim 24, wherein the locking element generates an acoustic signal upon displacement into the pre-locking position.

33. The fastening element according to claim 24, wherein, when the locking element element is positioned within the introduction opening of the second part, a portion of the second part is clampedly held between the trigger element and the locking element.

34. The fastening element according to claim 24, wherein, when the trigger element is moved into the releasing position, the locking element is displaced into the pre-locking position.

35. The fastening element according to claim 24, wherein an indicator element projects from the first end of the basic body when the trigger element is in the releasing position.

36. The fastening element according to claim 24, wherein the second end of the basic body abuts the trigger element when the trigger element is in the releasing position.

* * * * *